2,774,641
AUTOMOBILE SERVING TRAY HOLDER

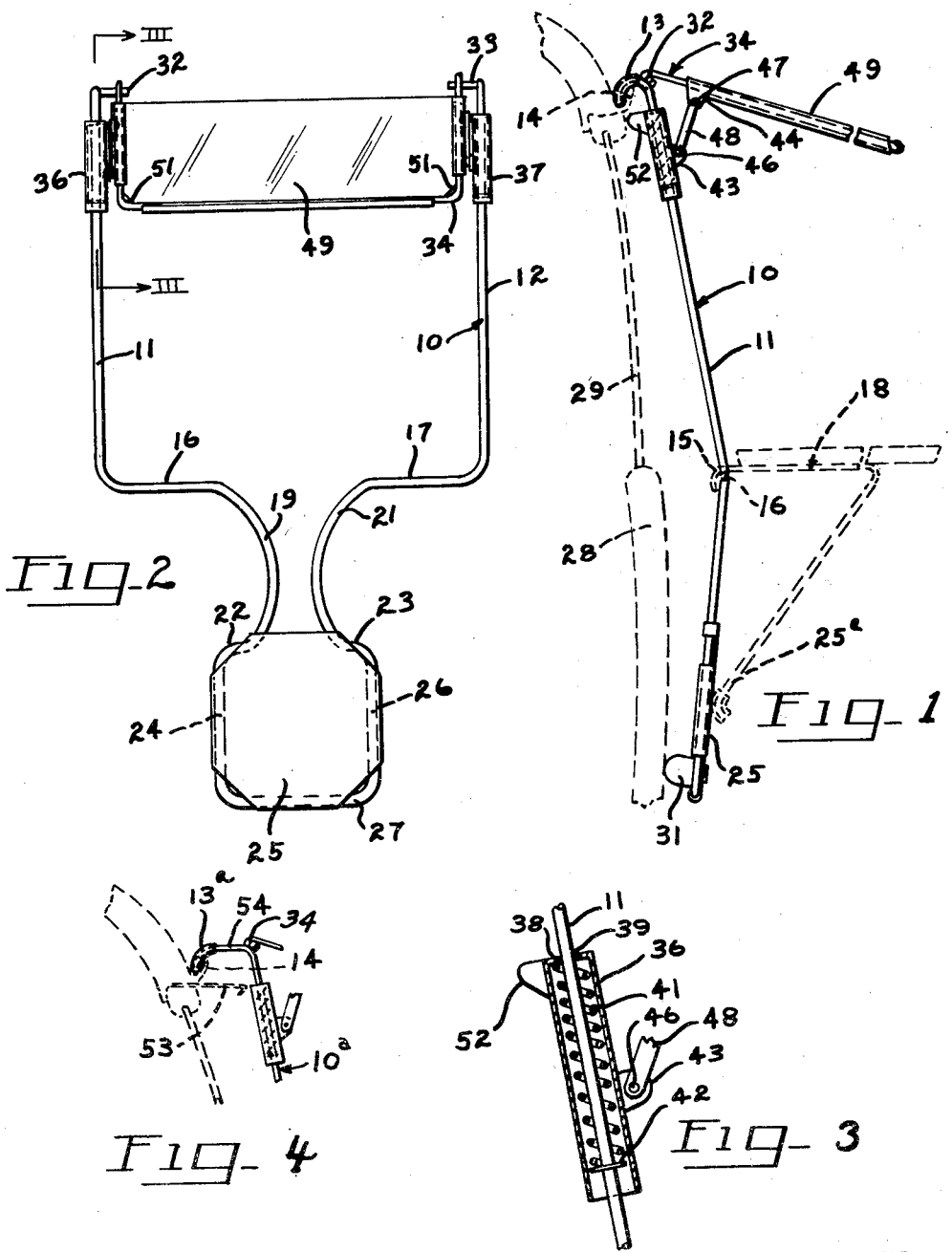

Robert L. Borders, Jr. and Geraldine Sitz, Gadsden, Ala.

Application July 22, 1955, Serial No. 523,649

2 Claims. (Cl. 311—22)

Our invention relates to a tray support for use in serving food or refreshments to persons seated in automobiles and has for an object the provision of a device of the character designated which may be used with an automobile without interfering with the raising and lowering of the automobile window; which shall provide support for a tray without hooking it over the window sill; which shall be light and readily handled by the person serving a customer; which shall be so constructed as not to mar or scratch the surface of the automobile; which shall include a canopy or awning to protect the tray from the weather, and which is foldable to lie flat against the support when not in use.

As is well known, the service of food and other refreshments by "drive in" restaurants to persons seated in automobiles has grown into an enormous business during the past few years. In all such establishments with which we are familiar it has been the practice to provide a tray which hooks over the window sill of the car and which has a supporting leg bearing against the side of the car. When so placed the car window can not be raised and this creates discomfort in cold or rainy weather; also placing the tray and its supporting leg on the window sill and against the door often mars or scratches the finish on the car.

The foregoing and other difficulties are overcome in accordance with our invention wherein we provide a supporting frame made from a bent metal rod with vertical arms having hooks on the upper ends adapted to engage the gutter above a car window. The main portion of the frame is bent outwardly to clear the body of the car and a foot at the lower end is provided with a pad of soft material to engage the car. Intermediate the ends, the frame is provided with horizontal portions over which a tray may be hooked and below the horizontal portions is a plate disposed to be engaged by the supporting leg of the tray. A canopy may be provided at the upper end which is yieldably supported and is foldable downwardly against the frame when not in use.

A device embodying features of our invention is shown in the accompanying drawing forming a part of this application, in which:

Fig. 1 is a side elevational view of the device showing the manner in which it is attached to an automobile, a portion of the automobile being shown in dotted lines;

Fig. 2 is a front elevational view of the device;

Fig. 3 is a sectional view taken along the line III—III of Fig. 2; and

Fig. 4 is a fragmental view showing a slightly modified form of our invention which is adapted for use with automobiles equipped with window awnings.

Referring now to the drawing for a better understanding of our invention, we show a supporting frame 10 having two parallel vertically extending arms 11 and 12. The upper ends of the arms 11 and 12 are bent over to provide hooks 13 which are adapted to hook over the window gutter of the automobile as shown at 14 in Fig. 1. The lower ends of the arms 11 and 12 are bent inwardly to provide horizontal portions 16 and 17 which form supports for the arms 15 of a conventional type serving tray shown in dotted lines at 18.

The inner ends of the horizontal portions 16 and 17 are bent downwardly as at 19 and 21, as shown in Fig. 2, to provide a handle for mounting the device on an automobile. The lower ends of the portions 19 and 21 are bent outwardly as at 22 and 23, downwardly, as at 24 and 26, and then inwardly as at 27, to form a closed lower end for the frame. A cover plate 25 formed of a suitable material, such as plastic, is secured to the closed lower end of the frame 10 in position to be engaged by the supporting leg 25a of the tray 18. Preferably, the edges of the cover plate 25 are rolled over the dowwnardly extending portions 24 and 26 and the inwardly extending portion 27 of the frame 10, as shown in Fig. 2. As shown in Fig. 1, the frame 10 is bent outwardly away from the body of the automobile, indicated in dotted lines at 28, so as to position the frame and the tray supported thereby outwardly of the automobile window indicated in dotted lines at 29. Secured to the lower end of the frame 10 is an inwardly extending pad 31 formed of a resilient material, such as rubber or the like, which engages the side of the automobile, as shown in Fig. 1.

Secured to the arms 11 and 12 adjacent the hooks 13 are inwardly extending pins 32 and 33. Hingedly connected to the pins 32 and 33 is a U-shaped awning frame 34 having its free ends bent over so as to encircle the pins 32 and 33, as shown in Fig. 1, whereby the frame 34 is adapted to swing outwardly of the frame 10. Mounted for sliding movement on the arms 11 and 12 are sleeves 36 and 37, respectively. The upper end of each sleeve is closed by a cover member 38 having a suitable opening 39 therein for receiving the arm 11 or 12, as the case may be. The lower ends of the sleeves 36 and 37 are left open, as shown in Fig. 3. Surrounding the arms 11 and 12 within the sleeves 36 and 37 are compression springs 41. Spring abutments 42 are secured to the arms 11 and 12 in position to engage the lower ends of the springs 41 whereby the springs are seated between the same and the cover members 38.

Mounted on the sleeves 36 and 37 are outwardly projecting brackets 43 and mounted on the awning frame 34 opposite the brackets 43 are inwardly extending brackets 44. Pivotally connected to the brackets 43 and 44 by means of pivot pins 46 and 47, respectively, are supporting links 48. The pivot pins 47 are positioned so that when the awning frame 34 is lowered, they pass dead center with respect to the pivot pins 43 and the pivot pins 32—33, thereby causing the compression spring 41 to hold the awning frame in closed position against frame 10. The awning frame 34 is of such length that when folded downwardly it rests against the horizontal portions 16 and 17 of the frame 10. The awning frame 34 is covered by a suitable cover 49, which is preferably inverted with the edges rolled over the frame 34 to form a catch basin for rain. Suitable openings 51 are provided in the lower corners of the cover 49 for discharging water which collects in the basin.

Mounted on the upper ends of the sleeve members 36 and 37 are inwardly extending catch members 52 which are disposed to engage the under surface of the gutter 14, as shown in Fig. 1. The catch members 52 thus hold the hooks 13 in engagement with the gutter 14 while the awning frame 34 is in raised position. As the awning frame 34 is lowered, the sleeves 36 and 37 together with their catch members 52 move downwardly out of engagement with the gutter 14 thus permitting the frame 10 to be disengaged from the automobile. The catch members 52 and the hooks 13 are covered by a suitable resilient material to prevent damage to the gutter 14.

From the foregoing description, the operation and use of our serving tray support will be readily understood. With the awning frame 34 in lowered position against the frame 10, the catch members 52 are positioned a substantial distance from the hooks 13 thus permitting the hooks to be placed over the gutter, as shown in Fig. 1. With the hooks 13 in engagement with the gutter 14, the awning frame 34 is moved outwardly to raised position whereupon the catch members 52 move upwardly into engagement with the under-surface of the gutter, thereby locking the device to the automobile. The resilient pad 31 at the lower end of the frame 10 engages the side of the automobile whereby the entire frame is held in spaced relation to the automobile. With the device thus attached to the automobile, the window 29 is free to move to raised or lowered position. The serving tray is attached to the frame 10 by inserting the arms 15 of the serving tray over the horizontal portions 16 and 17 of the frame 10 with the lower leg 25a of the serving tray pressing against the cover plate 25 at the lower end of frame 10. To remove the frame 10 from the automobile, the awning frame 34 is moved inwardly to lowered position whereupon the catch members 52 move downwardly with the sleeve members 36 and 37 out of engagement with the gutter 14, thus permitting the hooks 13 to be disengaged from the gutter.

In Fig. 4 we show a slightly modified form of our invention which is adapted for use on automobiles having window awnings indicated in dotted lines at 53. The upper ends of the vertical arms of the frame 10 are bent inwardly to provide a portion 54 which extends substantially parallel to the window awning 53. Hooks 13a are provided at the ends of the portions 54 which engage the gutter 14, as shown. The catch members 52 are not employed on the frame 10a due to the fact that the window awnings 53 would prevent the same from engaging the under-surface of the gutter. In all other respects, the construction of the supporting frame 10a is substantially identical with that of the supporting frame 10.

From the foregoing, it will be seen that we have devised an improved serving tray support which is adapted to use on automobiles without interfering in any way with the raising and lowering of the automobile windows. By providing resilient covers for the hooks 13 and the catch members 52 and a resilient pad 31 at the bottom of the frame, the surface of the automobile on which the device is attached is not marred or scratched. Also, the awning at the upper end of the frame protects the serving tray from the weather and serves as a latch to hold the device attached to the automobile while the awning is in raised position. Furthermore, when the awning is moved inwardly to lowered position, it lies flat against the supporting frame 10, thus requiring a minimum of space for storing the same.

While we have shown our invention in but two forms, it will be obvious to those skilled in the art that it is not so limited but is susceptible of various other changes and modifications without departing from the spirit thereof, and we desire, therefore, that only such limitations shall be placed thereupon as are specifically set forth in the appended claims.

What we claim is:

1. For use in supporting a serving tray on the outside of an automobile having a window with a gutter above it, a relatively rigid frame having substantially vertically extending arms, hook members at the upper ends of said arms disposed to hook over the gutter, an inwardly extending member adjacent the lower end of said frame adapted to engage a side of the automobile body, said arms being bowed outwardly intermediate said hook members and said inwardly extending member whereby they are positioned outwardly of the body of the automobile, a transverse tray supporting member connected to the outwardly bowed portion of said arms, and a tray leg support on said frame below said tray supporting member.

2. For use in supporting a serving tray on the outside of an automobile having a window with a gutter above it, a relatively rigid frame having substantially vertically extending arms, hook members at the upper ends of said arms disposed to hook over the gutter, sleeves slidably mounted on the arms, catch members on the sleeves disposed to engage beneath the gutter and when so engaged coacting with the hook members to secure the arms to the gutter, means operatively interposed between the sleeves and the arms resiliently urging the sleeves upwardly toward the hook members, an inwardly extending member adjacent the lower end of said frame adapted to engage a side of the automobile body, said arms being bowed outwardly intermediate said hook members and said inwardly extending member whereby they are positioned outwardly of the body of the automobile, a transverse tray supporting member connected to the outwardly bowed portions of said arms, and a tray leg support on said frame below said tray supporting member.

References Cited in the file of this patent

UNITED STATES PATENTS

| | | |
|---|---|---|
| 2,020,074 | McGinley | Nov. 5, 1935 |
| 2,314,550 | Olman | Mar. 23, 1943 |
| 2,474,943 | Hedger | July 5, 1949 |
| 2,593,909 | Moreland | Apr. 22, 1952 |
| 2,612,219 | Nelson | Sept. 30, 1952 |
| 2,631,912 | Pryor | Mar. 17, 1953 |
| 2,682,438 | Davis | June 29, 1954 |
| 2,683,507 | Coven et al. | July 13, 1954 |